United States Patent

[11] 3,629,069

[72] Inventor James R. Wright
Pinawa, Manitoba, Canada
[21] Appl. No. 859,964
[22] Filed Sept. 22, 1969
[45] Patented Dec. 21, 1971
[73] Assignee Atomic Energy of Canada Limited
Ottawa, Ontario, Canada

[54] REACTOR TUBE END CLOSURE
4 Claims, 1 Drawing Fig.
[52] U.S. Cl. ................................................ 176/87, 176/30
[51] Int. Cl. .................................................. G21b 3/10
[50] Field of Search ................................. 176/30, 31, 32, 77, 79, 87

[56] References Cited
UNITED STATES PATENTS

| | | | |
|---|---|---|---|
| 3,014,856 | 12/1961 | Nicklas | 176/81 X |
| 3,087,884 | 4/1963 | Martin | 176/77 |
| 3,125,123 | 3/1964 | Roche et al. | 176/30 X |
| 3,140,730 | 7/1964 | Costes | 176/30 X |
| 3,163,585 | 12/1964 | Metcalfe et al. | 176/87 |
| 3,227,623 | 1/1966 | White | 176/30 X |
| 3,287,230 | 11/1966 | Jerkins et al. | 176/77 |
| 3,340,154 | 9/1967 | Sinclair et al. | 176/30 X |
| 3,353,566 | 11/1967 | Cepkauskas et al. | 176/30 X |

Primary Examiner—Carl D. Quarforth
Assistant Examiner—Gary G. Solyst
Attorney—James R. Hughes ABSTRACT: A reactor tube end closure, comprising a cup-shaped closure body having a chamfered edge for engagement with a tapered surface on the inside of a reactor tube. A rotatable threaded spindle secured in the body has an internally threaded collar on it which carries a plurality of outwardly urged, spring-loaded struts. The struts form a collet assembly with each strut having a pad on its outer end for engagement in a recess in the reactor tube. By rotating a serrated wheel on the spindle in one direction the struts can be retracted to disengage the closure from the reactor tube, or by rotating in the other direction urge the seal faces into contact to form a leaktight seal.

PATENTED DEC 21 1971
3,629,069
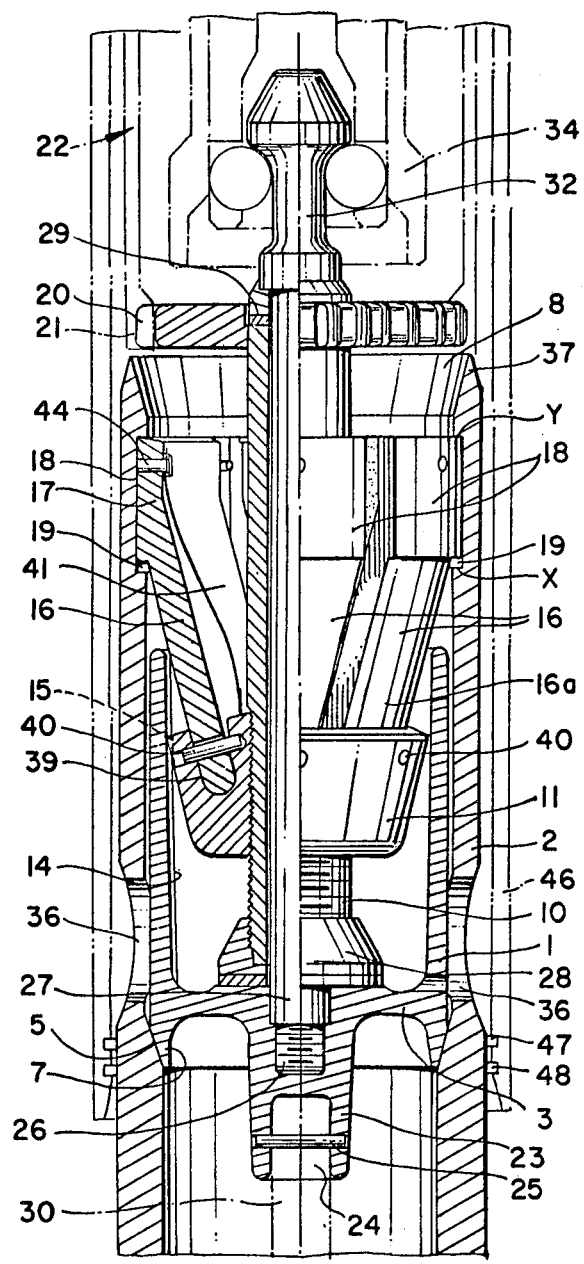
INVENTOR
JAMES R. WRIGHT
BY J.R. Hughes
AGENT

REACTOR TUBE END CLOSURE

This invention relates to a reactor tube end closure.

Conventional nuclear reactors comprise a core having a plurality of upwardly extending fuel tubes, with each fuel tube containing clusters of fuel elements connected one above another to form a fuel stringer. Pressurized primary coolant is generally passed upwardly along the fuel tubes and around the fuel elements, to be heated by them, and is then passed over heat exchange tubes to heat them and to generate steam in them. During the life of the fuel elements it is necessary to shuffle them, by removing them from one core tube in one part of the core and placing them in another core tube in another part of the core, to maintain as near as possible a uniform temperature throughout the core and to promote uniform burnup. Furthermore, it is necessary during this reshuffling to remove spent fuel elements from the core tubes and replace them by fresh fuel elements.

In more recent years various proposals have been put forward for shuffling and replacing fuel elements in a reactor core whilst the reactor is in operation, that is, whilst the core tubes contain pressurized primary coolant and the reactor is on-load. This has raised a problem in that reactor tube end closures must be provided for the fuel tubes, which may be remotely actuated by a fueling machine, to either seal the fuel tube or be removed therefrom to provide an unobstructed passage for the removal and replacement of a fuel stringer. A fueling machine for refueling a reactor on-load needs to be sealed to a fuel tube and pressurized before the reactor tube end closure is unsealed from that fuel tube, and so it is necessary for the reactor tube end closure to be remotely actuated from outside the core by, for example, simple and reliable linear and rotary motions.

It is one object of the invention to provide a reactor tube end closure which may be remotely actuated by a fueling machine to either seal a fuel tube or be removed therefrom to provide an unobstructed passage for the removal or replacement of a fuel stringer while the reactor is on load.

It is further object of the invention to provide a reactor tube end closure which is remotely actuated from outside the core by simple and reliable linear and rotary motions while the reactor is on load.

It is also desirable to provide a reactor tube end closure for sealing and providing access to a reactor tube in a reactor core which is used for experiments or instrumentation.

It is further object of the invention to provide a reactor tube end closure for sealing and providing access to a reactor tube in a reactor core which is used for experiments or instrumentation.

The invention provides a reactor tube end closure, comprising a cup-shaped closure body for insertion in said tube, said body having around the closed end a chamfered edge forming a seal face for engagement with a tapered surface on the inside of said tube near the entrance, a threaded spindle extending into the interior of said body and rotatably secured to said closed end, an internally threaded collar on a portion of said spindle disposed in said interior, means slidably connecting said collar to said body to prevent relative rotation between them, a plurality of springloaded struts forming a collet assembly and attached at different positions around said collar to slope outwardly from said interior away from said spindle, towards free ends of said struts disposed outside said interior, recess-engaging pads provided on said free ends and urged outwardly by said strut spring loading for engagement with a recessed portion of the inside of said tube, and means for connecting said spindle to a rotatable drive member of a fueling machine, whereby rotation of said spindle in one direction by said drive member will draw said collar and said closed end closer to draw said struts into said interior of and against the lip of said body and retract each said pad out of said recess.

In the accompanying drawing which illustrates, by way of example, an embodiment of the invention, there is shown a sectional side view of a reactor tube end closure sealing a reactor fuel tube.

In the drawing there is shown a reactor tube end closure having a cup-shaped closure body 1 inserted in a reactor fuel tube 2, the body 1 has around its closed end 3 a chamfered edge 5 forming a sealing face for engagement with a similarly tapered surface 7 on the inside of the tube 2 near the entrance 8. A threaded spindle 10 extends into the interior of the body 1 and is rotatably secured to the closed end 3. An internally threaded collar 11 is disposed on a portion of the spindle 10 in the interior of the body 1. Means in the form of a key 14 and keyway 15 are provided to slidably connect the collar 11 to the body 1 to prevent relative rotation between these members. A plurality, of spring-loaded struts 16, in this embodiment six, forming a collet assembly are attached at different positions around the collar 11 to slope outwardly from the interior of the body 1 towards free ends 17 of the struts 16 disposed outside the interior of the body 1. Recess-engaging pads 18 are provided on the free ends 17 and are urged outwardly, by the spring loading of the struts 16, for engagement with a dovetail-shaped recessed portion 19 of the inside of the tube 2. The recessed portion 19 has a lower land "$x$" and an upper land "$y$." A means, in the form of a serrated wheel 20, is provided for connecting the spindle 10 to a rotatable drive member 21 of a fueling machine generally designated 22, and shown chain-dotted.

The body 1 has a bore 23 in the closed end 3 provided with a bore 24 and pin 25 for securing an upper end of a fuel stringer assembly 30 (shown chain dotted) to the end closure. The closed end 3 also has a threaded recess 26 for a threaded end of a rod 27. The spindle 10 has an end thrust bearing 28 secured to its lower end and an upper bearing assembly 29 which rotatably mounted the spindle 10 and the serrated wheel 20 about the rod 27 in the body 1. The rod 27 has a waisted end 32 by which the closure and fuel stringer assembly are connected to a grab 34 of the fueling machine 22.

The tube 2 has core coolant drainage ports 36 disposed above the tapered surface 7. The upper end 37 of the tube 2 is chamfered both internally and externally.

The internally threaded collar 11 has an annular groove 39 into which the struts 16 extend and are loosely secured by pins 40 to permit angular movement of the struts. The struts 16 are each spring loaded by means of a leaf spring 41 located by, but not secured to the collar 11 and upper end to the strut 16 by a pin 44.

In operation the body 1, secured by the waisted end 32 of rod 27 to the grab 34 of the fueling machine, 22, is lowered into the tube 2 whilst a flask extension tube 46 (shown chain dotted) is sealed around the tube 2 with seals 47 and 48. The body 1 is lowered into the tube 2 until the struts 16 snap into the recessed portion 19 on the inside of the tube 2. The rotatable drive member 21, is then engaged with the serrated wheel 20 and is rotated to bring the pads 18 on the collet assembly into contact with the land "$y$" and then urge the body 1 downwardly until the chamfered edge 5 engages the tapered surface 7.

When it is required to break the seal the serrated wheel 20 is rotated by the member 21 in the opposite direction to draw the struts 16 into contact with land "$x$." Further rotation "Jacks" the seal surfaces 5 and 7 apart. Continued rotation of serrated wheel 20 draws body 1 over collect assembly collapsing the collet assembly so that the pads 18 will clear recessed portion, that is lands "$x$" and "$y$."

The member 1, with the struts 16 retracted in this manner, is then removed from the tube 2.

The high seal face loading that is possible with this seal makes it ideal for use with organic coolant reactor systems. Another desirable feature is the self-clearing feature of the sealing element and the self-cleaning mechanism built into the screw thread assembly which overcomes many difficulties which may be encountered by organic fouling. The invention may be used to seal fuel channel tubes or instrumentation tubes.

I claim:

1. A reactor tube end closure, comprising a cup-shaped closure body for insertion in said tube, said body having around the closed end a chamfered edge forming a seal face for engagement with a tapered surface on the inside of said tube near the entrance a threaded spindle extending into the interior of said body and rotatably secured to said closed end, and internally threaded collar on a portion of said spindle disposed in said interior, means slidably connecting said collar to said body to prevent relative rotation between them, a plurality of spring-loaded struts forming a collet assembly and attached at different positions around said collar to slope outwardly from said interior away from said spindle, towards free ends of said struts disposed outside said interior, recess-engaging pads provided on said free ends and urged outwardly by said strut spring loading for engagement with a recessed portion of the inside of said tube, and means for connecting said spindle to rotatable drive member of a fueling machine whereby rotation of said spindle in one direction by said drive member will draw said collar and said closed end closer to draw said struts into said interior of and against the lip of said body and retract each said pad out of said recess.

2. An end closure according to claim 1, wherein a central rod extends into and is connected to said cup-shaped member, and said threaded spindle is a hollow spindle rotatably mounted about said central rod.

3. An end closure according to claim 2, wherein said central rod extends out of said cup-shaped member beyond said hollow spindle, and an exposed end portion of said central rod is waisted to provide a gripping portion for a grab of a fueling machine.

4. An end closure according to claim 1, wherein said cup-shaped body has means for connecting a nuclear fuel stringer thereto.

* * * * *